United States Patent

Burklund et al.

[15] 3,682,417

[45] Aug. 8, 1972

[54] ENGAGEMENT OF ALTITUDE HOLD MODE IN AIRCRAFT FLIGHT CONTROL SYSTEM

[72] Inventors: Wayne E. Burklund, Los Angeles; Paul G. De Alva, Canoga Park, both of Calif.

[73] Assignee: Lear Siegler, Inc., Santa Monica, Calif.

[22] Filed: April 6, 1970

[21] Appl. No.: 25,666

[52] U.S. Cl. .............. 244/77 D, 244/77 SE, 318/584
[51] Int. Cl. ............................................. B64c 13/18
[58] Field of Search ......... 244/77, 77 A, 77 D, 77 SE; 318/584

[56] References Cited

UNITED STATES PATENTS

| | | | |
|---|---|---|---|
| 3,062,486 | 11/1962 | Shepherd | 244/7 SE |
| 3,167,276 | 1/1965 | Moosbrugger et al. | 244/77 D |
| 3,184,667 | 5/1965 | Kufert | 244/77 D X |
| 3,521,839 | 7/1970 | Diani | 244/77 D X |
| 2,873,418 | 2/1959 | Owen | 244/77 D X |
| 2,790,946 | 4/1957 | Yates, Jr. | 244/77 D X |

Primary Examiner—Buchler Milton
Assistant Examiner—Jeffrey L. Forman
Attorney—Jackson & Janes, Harold L. Jackson, Stanley R. Jones, Robert M. Vargo and Eric T. S. Chung

[57] ABSTRACT

An altitude hold mode is engaged responsive to a sensor of aircraft rate of altitude change and a control wheel force sensor when the rate of altitude change drops below a predetermined threshold value, and simultaneously therewith the pitch command force of the control wheel drops below a predetermined threshold value. The altitude hold mode is disengaged responsive exclusively to the control wheel force sensor when the pitch command force again rises above the predetermined threshold value.

16 Claims, 1 Drawing Figure

PATENTED AUG 8 1972         3,682,417
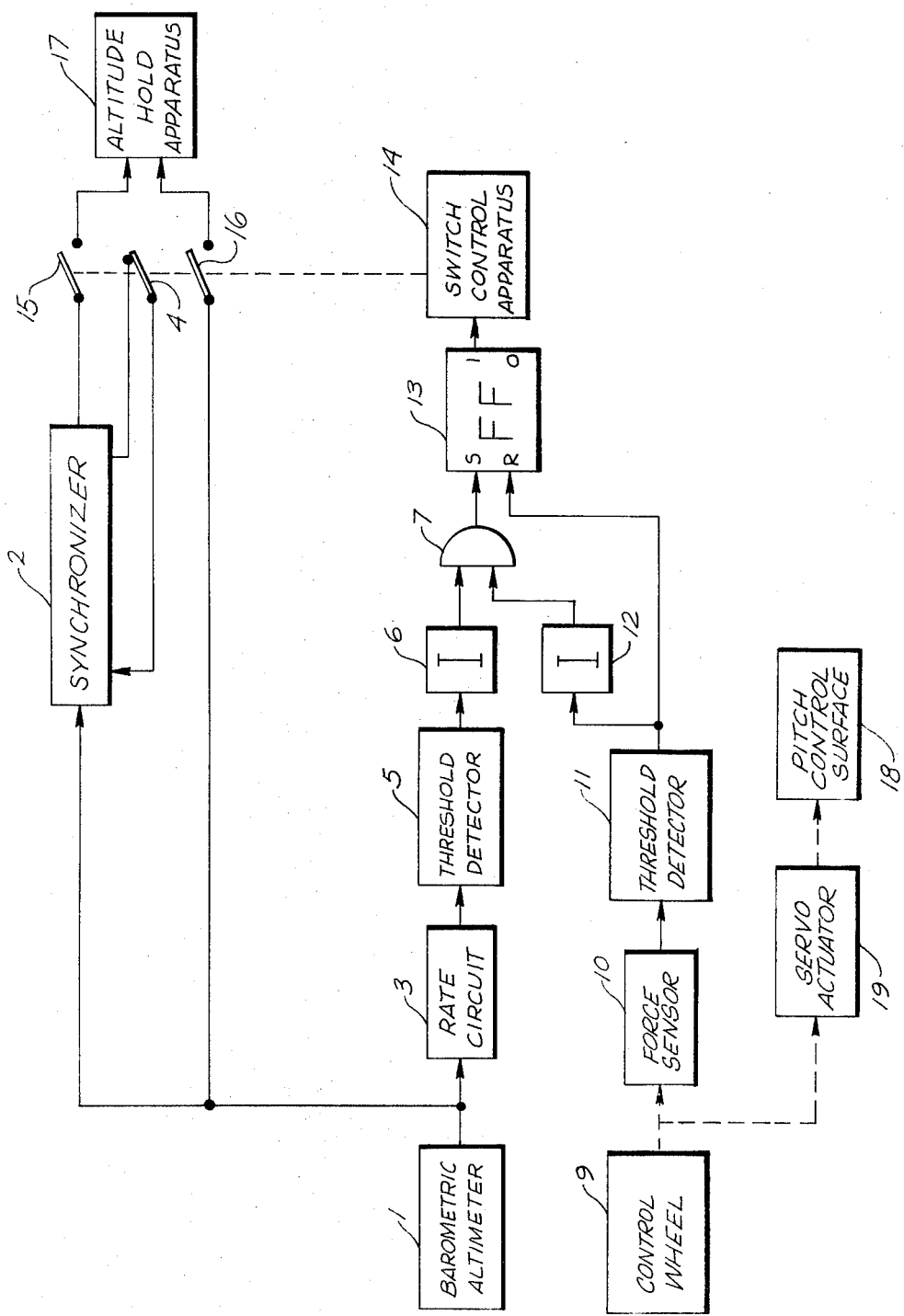
INVENTORS.
WAYNE E. BURKLUND
PAUL G. DE ALVA
BY
Christie, Parker & Hale
ATTORNEYS 3,682,417

ENGAGEMENT OF ALTITUDE HOLD MODE IN AIRCRAFT FLIGHT CONTROL SYSTEM

BACKGROUND OF THE INVENTION

This invention relates to aircraft flight control systems and, more particularly, to the engagement of an altitude hold mode in an aircraft flight control system. The invention is especially well suited for use during pilot controlled flight.

Altitude hold is a mode that is commonly provided in aircraft flight control systems. The output of a sensor of the actual aircraft altitude, i.e., a barometric altimeter, is differentially combined with the output of a selected reference altitude to produce a command signal that positions the pitch control surface. As a result, the aircraft is controlled so it flies at the reference altitude despite wind changes and other factors that influence the flight of the aircraft in a vertical direction. The altitude reference is conventionally a synchronizer, whose output is synchronized to the actual altitude prior to engagement of the altitude hold mode, and after engagement thereof is held at the value of actual altitude at the time the altitude hold mode is engaged.

To enter an altitude hold mode, the pilot first flies aircraft aircraft into level flight at the desired altitude to be held with his control wheel or stick, and then manually actuates a switch that engages the altitude hold apparatus. The actuation of the altitude hold engaging switch at the proper time in the maneuver diverts the pilot's attention from other activities. Further, human error in reading the cockpit instruments may result in an untimely engagement of the altitude hold mode.

Miller U.S. Pat. No. 2,240,446, which issued on Mar. 15, 1966, discloses a flight control system in which an altitude hold mode is automatically engaged as a function of the aircraft's vertical speed, i.e., rate of altitude change. As the aircraft flares toward the altitude to be held, its vertical speed drops. An engage switch is actuated when the vertical speed reaches zero. Thus, ideally the pilot's attention is not required to engage the altitude hold mode at the proper time. In practice, however, atmospheric disturbances may give rise to an untimely engagement of the altitude hold mode. For example, an upward wind gust would increase the vertical speed and delay engagement; a downward wind gust would decrease the vertical speed and advance engagement. The untimely engagement of the altitude hold mode may cause the synchronizer to hold at a value of altitude that deviates from the desired altitude to be held.

SUMMARY OF THE INVENTION

The invention contemplates the conjunctive use of the aircraft vertical speed, i.e., the rate of altitude change, and the pitch command, as the criteria for determining when the altitude hold mode should be engaged. Accordingly, the altitude hold mode can be automatically engaged responsive to the output of a sensor of the rate of altitude change of the aircraft when it drops below a predetermined value and the output of a pitch command source, when it simultaneously drops below a predetermined value. The use of the two named criteria conjunctively results in timely engagement of the altitude hold mode because, although the one criterion, the vertical speed, is affected by atmospheric disturbances, the other criterion, the pitch command, is not.

The invention can be employed in conjunction with any pitch command source, i.e., a source of commands that control the pitch control surface of the aircraft. However, the invention is of particular importance during pilot controlled flight in which the pitch command source is a control wheel force sensor or a similar pilot operated device. As the pilot commands the aircraft to level flight at a selected altitude with his control wheel or other pitch input device, the altitude hold apparatus is automatically engaged when the rate of altitude change and the signal generated by the control wheel force sensor both simultaneously drop below predetermined values. In essence, the control wheel force sensor, which reflects the pilot's intent, serves to ensure that the altitude hold mode is not untimely engaged due to an atmospheric disturbance. Further, the rate of altitude change sensor serves to ensure that the altitude hold mode is not engaged when the aircraft is climbing or descending.

A feature of the invention concerns a component sharing implementation of a logical arrangement for engaging and disengaging an altitude hold mode. One threshold detector is connected to the output of a rate of altitude change sensor, and a second threshold detector is connected to the output of a pitch command source such as a control wheel force sensor. Each threshold detector is actuated when its input is above a predetermined threshold level. The outputs of the threshold detectors are coupled through inverters to the inputs of an AND gate. The output of the AND gate is coupled to the set input of a control flip-flop. The second threshold detector is also directly connected to the reset input of the control flip-flop. When the inputs of both threshold detectors are below the threshold level, the AND gate sets the flip-flop and engages the altitude hold apparatus. Thereafter, when the control wheel force sensor generates a signal that exceeds the threshold value, the control flip-flop is reset thereby disengaging the altitude hold apparatus.

BRIEF DESCRIPTION OF THE DRAWING

The features of a specific embodiment of the best mode contemplated of carrying out the invention are illustrated in the drawing, the single figure of which is a block schematic diagram of a flight control system incorporating the principles of the invention.

DETAILED DESCRIPTION OF THE SPECIFIC EMBODIMENT

The components shown in the drawing are all located on board an aircraft. The output of a barometric altimeter 1 is an electrical signal representative of the actual altitude of the aircraft. Altimeter 1 is coupled to the inputs of a synchronizer 2 and a rate circuit 3. Synchronizer 2 is a conventional component in flight control systems, which is capable of functioning in one of two modes of operation depending upon the state of a switch 4. When switch 4 is closed, as shown in the drawing, synchronizer 2 is in a synchronizing mode, its output being synchronized to the signal applied to its input, i.e., the actual altitude registered by altimeter 1. When switch 4 is open, synchronizer 2 operates in a hold mode, its output remaining at its value at the instant that switch 4 was opened. By way of example, synchronizer 2 could take the form of one of the signal generators, disclosed in Tippetts U.S. Pat. No. 3,404,857, which issued Oct. 8, 1968, to the assignee of the present application. Prior to engagement of the altitude hold mode and after disengagement thereof, synchronizer 2 is in a synchronizing mode so its output remains synchronized to the actual altitude of the aircraft.

The output of rate circuit 3 is representative of the aircraft's vertical velocity, i.e., its rate of change of altitude. Rate circuit 3 is coupled to the input of a threshold detector 5. Threshold detector 5 has a binary output that assumes one of two states, e.g., ground potential or a positive potential. When the output of rate circuit 3 is above a predetermined threshold value, the output of threshold detector 5 is in one state, e.g., the positive potential. When the output of rate circuit 3 drops below the predetermined threshold value, the output of threshold detector 5 changes to the other state, e.g., ground potential. Threshold detector 5 is coupled through an inverter 6 to one input of an AND gate 7. Inverter 6 inverts the state of the output of threshold detector 5. In other words, when the output of threshold detector 5 is at the positive potential, the output of inverter 6 is at ground potential, and vice versa.

The force exerted by the pilot on a control wheel 9 of the aircraft along the pitch axis is converted to an electrical signal by a conventional force sensor 10. In stead of a control wheel force sensor, any other type of pilot operated input device for commanding aircraft pitch altitude could be employed. Force sensor 10 is coupled to the input of threshold detector 11. Threshold detector 11 also has a binary output that assumes one of tow states, e.g., ground potential or a positive potential, depending upon whether the output of force sensor 10 is above or below the predetermined threshold value. Threshold detector 11 is coupled through an inverter 12 to the other input of AND gate 7 and is directly coupled to the reset input of a control flip-flop 13, designated R in the drawing. The output of AND gate 7 is coupled to the set input of flip-flop 13, designated S in the drawing.

Flip-flop 13 1"two outputs designated "1" and "0" in the drawing. When the set input of flip-flop 23 is energized, flip-flop 13 assumes the state in which its "1" output is energized, e.g., at a positive potential. When the reset input of flip-flop 13 is energized, flip-flop 13 assumes the state in which its "1" output is deenergized, e.g., at ground potential. The "1" output of flip-flop 13 is connected to switch control apparatus 14, which, for example, could comprise a relay coil if mechanical switches are employed and drive circuitry if electronic switches are employed.

For the purpose of explaining the operation of the described components, it is assumed that the aircraft is initially in a steep climb toward some altitude to be held. As long as either or both of the outputs of rate circuit 3 and force sensor 10 are above their respective threshold values, flip-flop 13 assumes the state in which its "1" output is deenergized and switch control apparatus 14 remains unactuated. During this climbing maneuver, the aircraft has a large rate of altitude change, so the input of threshold detector 5 is well above its threshold value. As the aircraft approaches the altitude to be held, the pilot flares the aircraft out toward level flight by applying a pitch command through his control wheel. During the flare maneuver, the output of force sensor 10 lies above the threshold level of detector 11, and the rate of altitude change drops toward the threshold level of detector 5. When the aircraft is substantially in level flight at the altitude to be held, the rate of altitude change is substantially zero so the output of rate circuit 3 is below the threshold level of detector 5. At such time the pilot is introducing no pitch command through control wheel 9, so the output of force sensor 10 is also below the threshold level of detector 11. Consequently, the outputs of inverters 6 and 12 are both at a positive potential so the output of AND gate 7 assumes a positive potential. When the output of AND gate 7 assumes a positive potential, flip-flop 13 is set, its "1" output assuming a positive potential, which actuates switch control apparatus 14. Responsive to the actuation of switch control apparatus 14, a normally open switch 15 is closed, a normally open switch 16 is closed, and normally closed switch 4 is opened. Switch 15 couples the output of synchronizer 2 to altitude hold apparatus 17. Switch 16 couples the output of altimeter 1 to altitude hold apparatus 17. Thus, the actuation of switch control apparatus 14 engages altitude hold apparatus 17 and converts synchronizer 2 to its hold mode by the opening of switch 4. Altitude hold apparatus 17 positions a pitch control surface 18 on the aircraft through a coupling that is not shown so the actual aircraft altitude is maintained at the reference altitude held by synchronizer 2. The pitch commands introduced by control wheel 9 are mechanically coupled by a servo actuator 19 to pitch control surface 18. The dashed lines in the drawing represent such mechanical couplings.

When the pilot wishes to disengage the altitude hold mode, he introduces a pitch command through control wheel 9. Responsive thereto, the output of force sensor 10 rises above the threshold level of detector 11, and the output of detector 11 assumes a positive potential, which resets flip-flop 13. As a result, switch control apparatus 14 is deactuated once again, and altitude apparatus 17 is disengaged responsive exclusively to force sensor 10. It might be desirable to use different threshold levels responsive to the output of force sensor 10 to engage and disengage the altitude hold apparatus 17. In such case, another threshold detector could be provided between force sensor 10 and the reset input of flip-flop 13.

Broadly, the output of rate circuit 3 is indicative of the deviation of the aircraft from level flight, i.e., at perfectly level flight there is no signal at the output of rate circuit 3. Conceivably, other types of sensors whose outputs are indicative of the deviation of the aircraft from level flight could be used instead of a rate of change of altitude sensor.

The use of information from control wheel force sensor 10 in addition to the rate of altitude change to engage the altitude hold mode prevents the untimely engagement which might otherwise occur due to a sudden wind gust or other atmospheric disturbance. Such a disturbance could momentarily alter the rate of altitude change so it drops below the threshold level of detector prematurely or late. The intent of the pilot, as reflected by the output of force sensor 10, is used conjunctively with the rate of altitude change of the aircraft to determine the point at which the altitude hold mode should be engaged, there by eliminating the effect of atmospheric disturbances on the engagement of the altitude hold mode. Instead of a pitch command introduced by the pilot, the output of a flare computer or other pitch command for the pitch control surface could be utilized. Either source is a measure of the activity of control surface 18. Alternatively, other measures of the activity of control surface 18, such as the rate of change of displacement of control surface 18, could conceivably be used.

It is to be noted the same threshold detector required for disengagement of the altitude hold mode, i.e., threshold detector 11, is employed in the implementation of the conjunction conditions to engage the altitude hold mode automatically. Thus, component sharing takes place.

Although the invention is most useful to engage altitude hold apparatus automatically, it could also be employed to actuate an annunciator that tells the pilot when to engage the altitude hold apparatus manually. In such case, the pilot is spared the effort associated with the interpretation of the cockpit instruments.

The term "threshold detector" in this specification includes a so-called null detector and the term "threshold level" includes a zero level.

What is claimed is:

1. Aircraft flight control apparatus comprising:
   engageable means for controlling the aircraft to hold it at a constant altitude;
   a source of pitch command signals;
   means for sensing the rate of altitude change of the aircraft;
   first threshold detecting means having an input connected to the sensing means;
   second threshold detecting means having an input connected to the source; and
   switch control apparatus operative responsive to the conjunctive actuation of the first and second threshold detecting means to engage the controlling means.

2. The apparatus of claim 1, in which the source is a pilot operated pitch command device.

3. The apparatus of claim 2, in which an aircraft pitch control surface is provided and the means for controlling the aircraft comprises a synchronizer, the input of which is connected to the sensing means, the output of the synchronizer being synchronized to the output of the sensing means when the controlling means is disengaged and being held at the synchronized value when the controlling means is engaged, and means operative upon the actuation of the switch control apparatus for positioning the pitch control surface so the output of the sensing means remains substantially the same as the held value at the output of the synchronizer.

4. The apparatus of claim 3, in which the source is coupled to the pitch controls surface to position it.

5. The apparatus of claim 4, in which the sensing means comprises a barometric altimeter and a rate circuit the input of which is connected to the barometric altimeter.

6. The apparatus of claim 1, in which the switch control apparatus is operative responsive exclusively to the deactuation of the second threshold detecting means to disengage the controlling means.

7. The apparatus of claim 6, in which an aircraft pitch control surface is provided and the means for controlling the aircraft comprises a synchronizer, the input of which is connected to the sensing means, the output of the synchronizer being synchronized to the output of the sensing means when the controlling means is disengaged and being held at the synchronized value when the controlling means is engaged, and means upon engagement for positioning the pitch control surface so the output of the sensing means remains substantially the same as the held value at the output of the synchronizer.

8. The apparatus of claim 1, in which the source is a control wheel force sensor.

9. The apparatus of claim 1, in which an aircraft pitch control surface is provided and the source is coupled to the pitch control surface to position it.

10. The apparatus of claim 1, in which the sensing means comprises a barometric altimeter and a rate circuit the input of which is connected to the barometric altimeter.

11. A flight control system for an aircraft having a pitch control surface, the system comprising:
    first means for generating a first signal representative of the deviation of the aircraft from level flight;
    second means for generating a second signal representative of the activity of the pitch control surface;
    altitude hold apparatus;
    a bistable device for engaging and disengaging the altitude hold apparatus, the bistable device engaging the altitude hold apparatus when it is in a first state and disengaging the altitude hold apparatus when it is in a second state;
    a first threshold detector responsive to the first signal, the first threshold detector generating an indication when the first signal drops below a predetermined threshold value;
    a second threshold detector responsive to the second signal, the second threshold detector generating an indication when the second signal drops below a predetermined threshold value; and
    means responsive to concurrent indications from the first and second threshold detectors for placing the bistable device in the first state.

12. The system of claim 11, in which the first means generates a first signal that is representative of the rate of altitude change of the aircraft.

13. The system of claim 12, in which the first means comprises a barometric altimeter and means for deriving the rate of change of the output of the barometric altimeter.

14. The system of claim 11, in which the second means generates a second signal that is representative of the pitch command to be executed by the aircraft.

15. The system of claim 14, in which the second means comprises a pilot control wheel and means for sensing the force exerted on the control wheel by the pilot along the pitch axis.

16. The system of claim 11, additionally comprising means exclusively responsive to the absence of an indication from the second threshold detector for placing the bistable device in the second state.

* * * * *